United States Patent [19]
Berry et al.

[11] Patent Number: 5,758,256
[45] Date of Patent: May 26, 1998

[54] METHOD OF TRANSPORTING SPEECH INFORMATION IN A WIRELESS CELLULAR SYSTEM

[75] Inventors: Kirk H. Berry, Germantown; Debabrata Chowdhury, Frederick; Shrirang Jangi, Germantown; Kumar Swaminathan, Gaithersburg, all of Md.

[73] Assignee: Hughes Electronics Corporation, El Segundo, Calif.

[21] Appl. No.: 483,426

[22] Filed: Jun. 7, 1995

[51] Int. Cl.⁶ .................. H04M 11/00; H04Q 7/00
[52] U.S. Cl. .................. 455/72; 455/403; 370/466
[58] Field of Search .................. 379/58, 63, 59, 379/93; 455/33.1, 11.1; 370/58.1, 60.1, 62, 79, 85.1, 85.13, 94.1, 94.2, 95.1; 375/240, 241

[56] References Cited

U.S. PATENT DOCUMENTS

| | | | |
|---|---|---|---|
| 4,979,169 | 12/1990 | Almond et al. | 370/466 |
| 5,056,058 | 10/1991 | Hirata et al. | 370/466 X |
| 5,182,748 | 1/1993 | Sakata et al. | 370/466 |
| 5,258,983 | 11/1993 | Lane et al. | 455/72 X |
| 5,428,771 | 6/1995 | Daniels et al. | 370/466 X |
| 5,483,531 | 1/1996 | Jouin et al. | 370/110.1 X |
| 5,495,468 | 2/1996 | Leveque | 455/72 X |
| 5,555,260 | 9/1996 | Rinnback et al. | 455/72 X |
| 5,623,491 | 4/1997 | Skoog | 370/397 |
| 5,631,648 | 5/1997 | Yamada et al. | 341/138 |

*Primary Examiner*—David R. Hudspeth
*Assistant Examiner*—Scott Richardson
*Attorney, Agent, or Firm*—John Whelan; Michael Sales

[57] ABSTRACT

A method of transporting speech information over a wireless cellular communications system is provided. By determining the existence and compatibility of the destination port with the origination port in a given telephone call, the present invention is capable of using only one compression step and one decompression step. Accordingly, voice signal degradation and delay associated with multiple compression/decompression steps may be reduced.

19 Claims, 7 Drawing Sheets

METHOD OF TRANSPORTING SPEECH INFORMATION IN A WIRELESS CELLULAR SYSTEM

BACKGROUND OF THE INVENTION

Wireless cellular communication systems carry voice signals and other information that are transmitted over a cellular network or the public switched telephone network (PSTN) and directed to various destinations. A telephone handset is used to convert speech into analog voice signals. The voice signals are then processed in a fixed subscriber unit (FSU) so that they may be transmitted over a specific band of airwaves. The FSU compresses the voice signals to maximize the number of conversations that may be carried over the airways.

Typically, a wireless cellular system also has a base transceiver system (BTS) and a base station controller (BSC). These devices receive the signals transmitted by the FSU, and decompress the voice signals for transmission over the PSTN lines. The decompressed signals travel over the PSTN lines until they reach their predetermined destination. If the destination is a telephone connected to an FSU in another wireless cellular system, the voice signals are again compressed, then transmitted from the destination BSC to the destination FSU where they are decompressed yet another time. Each time a voice signal is compressed and decompressed, the voice signal is audibly degraded. Additionally, each time the voice signals are compressed and decompressed, the signals are delayed due to the processing required.

Thus, in a typical call between wireless cellular systems, voice signals are taken through two compressions and two decompressions. This is done primarily because noncompatible telephones on the PSTN cannot understand compressed voice signals, so the compressed signal from the originating FSU must be decompressed before transmission on the PSTN. Also, even if the destination of the voice signal is a compatible FSU, the originating FSU has no way of knowing this.

Accordingly, a method of transporting voice signals is needed that will minimize voice signal degradation and delay, as well as recognize the type of destination to which a voice signal is sent.

SUMMARY OF THE INVENTION

The present invention generally relates to a method of transporting voice signals between wireless cellular systems such that the voice signals are only compressed and decompressed a single time. More specifically, the method involves first determining the compatibility of a destination port with the origination port of a voice signal. Next, a voice signal is provided at the origination port. The voice signal is then converted into a digital signal, and the origination subscriber unit port compresses the digital signal. After the voice signal is compressed, packets of the compressed digital signals are created and transmitted to the predetermined destination.

According to a first aspect of the present invention, the preferred single compression/decompression and packet transmission format is initiated using useruser information channels to determine compatibility of the source and destination subscriber units. According to a second aspect, in-band signalling is used to determine compatibility of the source and destination subscriber units for the single compression/decompression and packet transmission format.

The present invention is capable of utilizing existing equipment in a fixed wireless cellular system to handle telephone calls from one FSU to another FSU, and from an FSU to a non-cellular destination, using only one compression/decompression step for calls to a compatible destination FSU. Accordingly, the present invention provides a method for compressing and decompressing a voice signal only one time, thereby reducing both the degradation of the voice signal and the delay caused by the second decompression/compression step. Additionally, the method can be performed on existing cellular communication equipment.

The invention itself, together with its attendant advantages, will best be understood by reference to the following detailed description, taken in conjunction with the accompanying drawings.

DETAILED DESCRIPTION OF THE DRAWINGS

Figure 1:
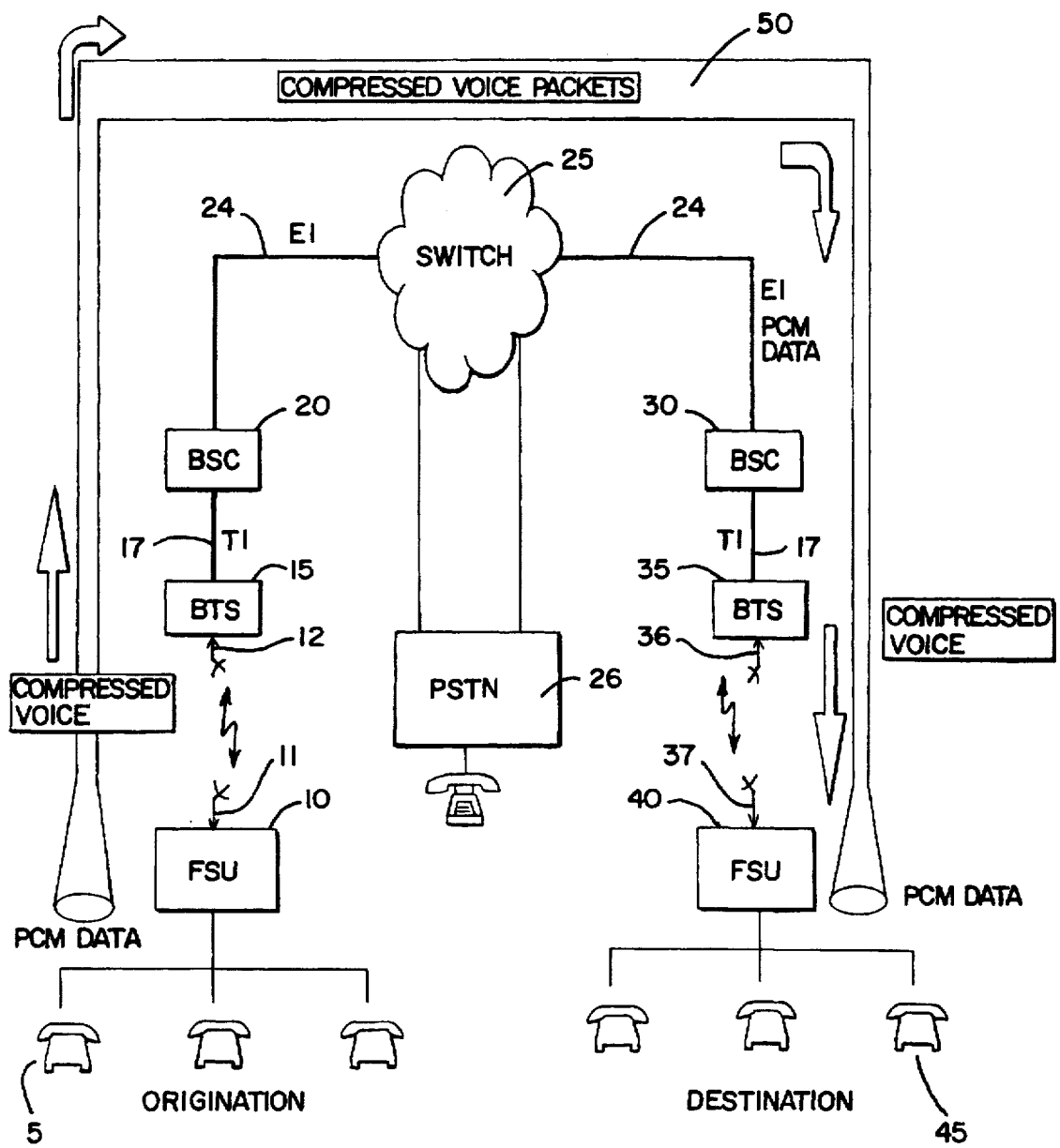
FIG. 1 illustrates a signal path of a voice signal transported over a wireless cellular system using a preferred embodiment of the present invention.

FIG. 1 illustrates a voice signal being transported according to the method of the present invention. The source and destination for the telephone call are compatible cellular devices that may be fixed or portable. In a fixed wireless cellular system, the voice signal originates at a telephone handset 5, typically an analog handset, and is transmitted to an origination port such as a fixed-subscriber unit (FSU) 10. The FSU 10, which may be a multi-subscriber unit (MSU), converts the analog voice signal into a pulse code modulated (PCM) digital signal and then compresses the PCM signal. Preferably, the wireless cellular system utilizes mu-law or A-law PCM encoding formats commonly known in the art. The PCM signal is preferably compressed before transmission over cellular air wave frequencies. The PCM signal is preferably compressed to approximately 5 kilobits-per-second.

The compressed signal is then transmitted from an antenna 11 connected to the FSU 10 along cellular frequencies to an antenna 12 connected to a base transceiver system (BTS) 15. The BTS 15 is responsible for controlling the radio frequency (RF) cellular frequencies received from and transmitted to the FSU 10. After it receives the RF signal, the BTS 15 transports the compressed voice signal along a standard T1 line 17 to a base station controller (BSC) 20. The BSC 20 packetizes the compressed voice signal and then transports it along standard E1 transmission lines 24 to a switch 25 which directs the compressed signal to the proper destination BSC 30. The switch is preferably a mobile switching center (MSC) with user-user signalling capability.

The destination BSC 30 depacketizes the compressed digital signal and transports it along standard T1 lines 17 to a destination BTS 35. The BTS 35 then transmits the compressed signal from an antenna 3G connected to the BTS to an antenna 37 connected to the destination FSU 40 over a radio link using RF cellular frequencies. The destination FSU 40 decompresses the compressed voice data back into an analog signal which is then sent to the telephone handset 45. The signal path 50 in FIG. 1 pictorially represents the voice signal compression and decompression steps in a FSU 10 to FSU 40 call according to a preferred embodiment by showing a funnel shape where the signal is compressed or decompressed. Although the BTS to BSC connections are illustrated in FIG. 1 as T1 lines and the BSC to switch connections are shown as E1 lines, the connections may be either T1 or E1 lines. Additionally, cellular configurations other than shown in FIG. 1 may be used with a presently preferred embodiment of the invention.

Previously, an FSU 10 to FSU 40 call required two compression and two decompression steps. The prior method of transporting speech information involved a decompression step at the source BSC 20 and a compression step at the destination BSC 30 for outgoing calls and the reverse for incoming calls. The decompression/compression at the BSC 20, 30 was in addition to the decompression/compression at the FSU 10, 40. So, rather than sending a compressed, packetized signal, the prior method was to decompress the voice signal to a 64 kilobits per second (kbps) digital PCM signal at the BSC 20, 30 for transmission on the E1 transmission lines 24.

Referring again to FIG. 1, there will be calls originating from or destined for the PSTN 26 that the present method must account for. When a call is placed from an FSU 10 to a non-cellular or incompatible telephone on the PSTN 26, the FSU 10 compresses the voice signal and the BSC 20 will decompress the signal to the standard 64 kbps PCM signal carried on PSTN lines. The reverse process takes place when a call is received from a non-cellular or incompatible phone. The switch 25 simply routes the calls between the different systems and does not perform any special processing. Another possible scenario is a call from an FSU 10 in a cellular system which is directed to a compatible FSU 40 in another cellular system but must travel over the PSTN 26 to reach the other cellular system. In this instance, the single compression/decompression steps of the present method may be used if the PSTN 26 lines are capable of carrying uncorrupted digital information. Otherwise, calls between different but compatible cellular systems carried over the PSTN 26 must use the prior method of compression/decompression.

Figure 2:
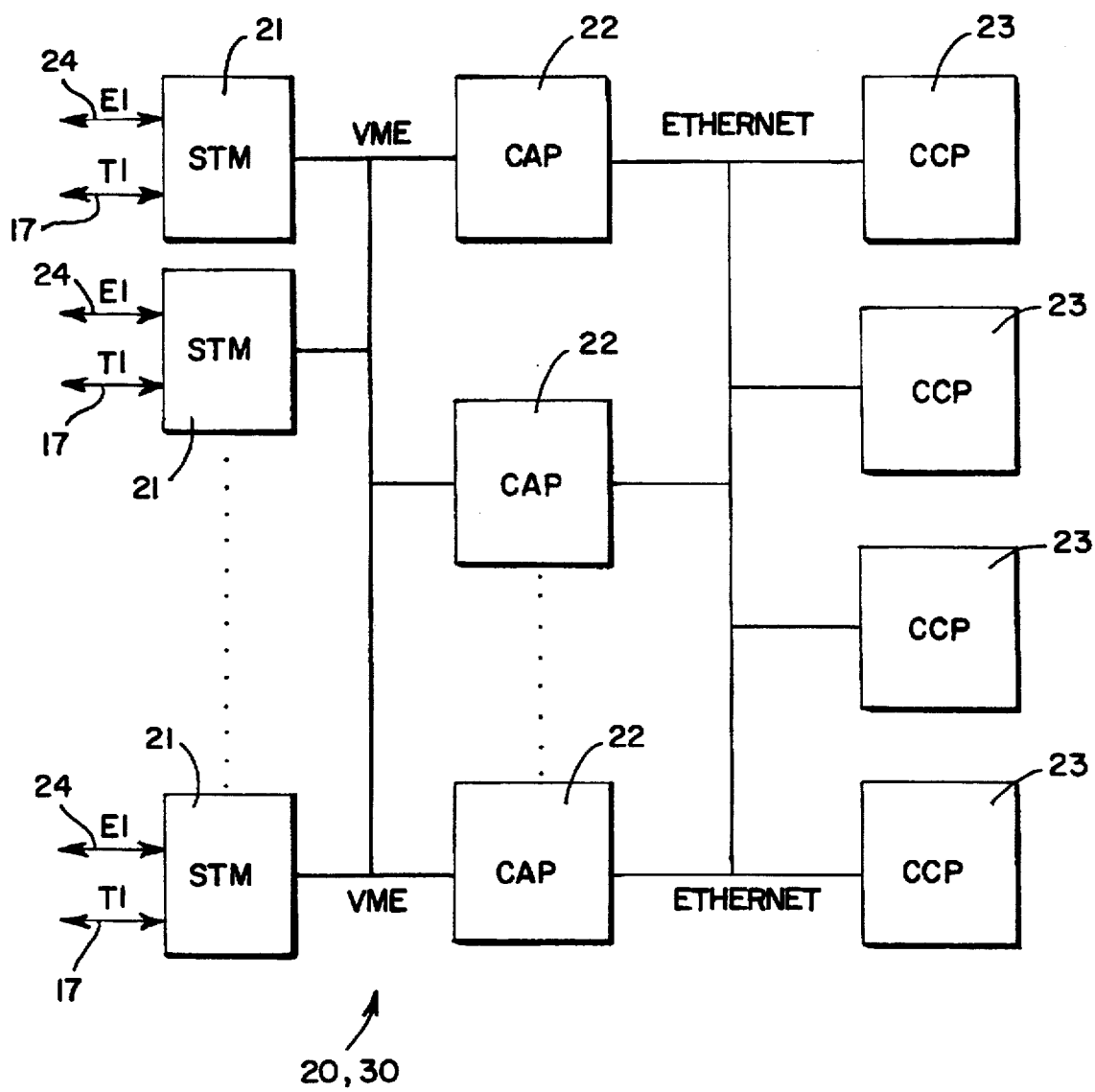
FIG. 2 is a diagram of a base station controller (BSC) for use in the wireless cellular system of FIG. 1.

FIG. 2 is a block diagram of the different components of a BSC 20, 30. The BSC 20, 30 includes a plurality of switching transcoder modules (STM) 21, at least one channel allocation processor (CAP) 22, and at least one call control processor (CCP) 23. Each of the different components in the BSC 20, 30 (STM 21, CAP 22, and CCP 23) are circuit boards that preferably incorporate an Intel 960 32-bit RISC microprocessor. Each STM 21 is connected to the T1 and E1 transmission lines 17, 24. The T1 and E1 transmission lines 17, 24 can carry multiple channels of telephone calls. The CAPs 22 assign specific STMs 21 to a particular channel corresponding to a particular call carried on the T1 and E1 lines 17, 24. The STMs 21 may be interconnected with one or more CAPs 22. This interconnection is preferably through a VME standard data bus. The one or more CAPs 22 are connected to one or more CCPs 23, preferably through an ethernet standard data bus. The STMs 21 receive and transmit voice information data. The CAPs 22 control connections to cellular airwaves and T1 transmission lines 17. The CCPs 23 are responsible for telephone call control generally.

Preferably, three types of STMs 21 are used. A voice-activity-detector (VAD) STM determines when speech stops or starts. The VAD STM detects speech signals received from the BSC 20, 30 or the BTS 15, 35. The traffic (TRF) STM compresses or decompresses voice information and puts the compressed information in packets, or decodes the information from packets, depending upon whether it is receiving or transmitting the information. The packet data format takes advantage of the extra space on the E1 lines 24 that is available when the voice information remains compressed in digital form. A comfort-noise-generation (CNG) STM transmits only idle bits on the E1 transmission line 24 when no voice activity is detected by the VAD STM. A preferred comfort noise generation method is disclosed in copending U.S. application Ser. No. 07/890,747, the entire disclosure of which is incorporated herein by reference.

Figure 3:
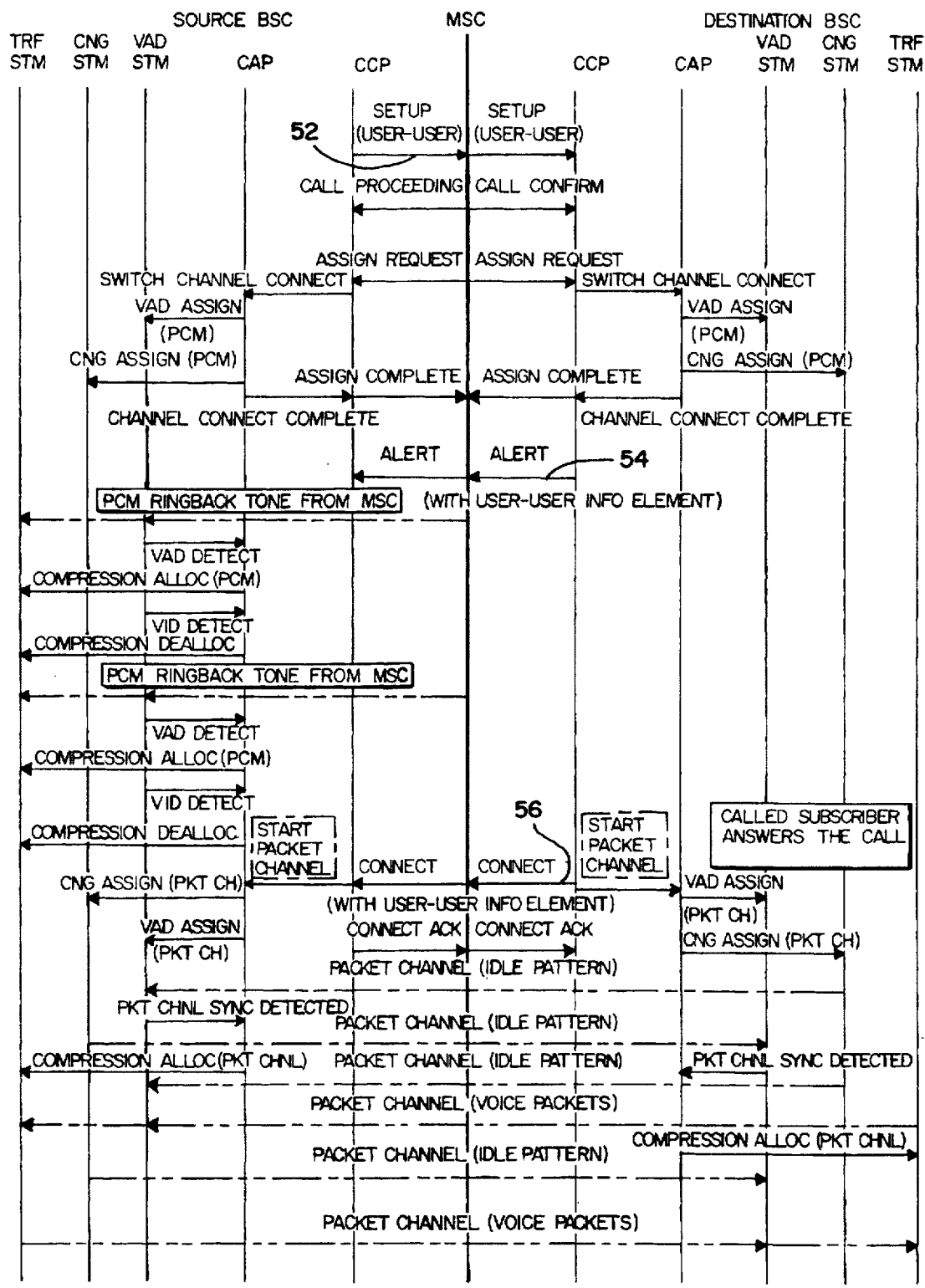
FIG. 3 is a call flow chart of a voice signal transported according to a preferred embodiment of the present invention.

FIG. 3 illustrates a call flow chart of a voice signal transported according to a preferred embodiment of the present invention. First, the compatibility of the destination BSC 30 with the source BSC 20 is determined. When a telephone call on the fixed wireless cellular system is initiated, the source BSC 20 exchanges call setup information with the destination BSC 30. The call control processor (CCP) 23 assigned to the particular telephone call from the source BSC uses various call set-up messages (SETUP 52, ALERT 54 and CONNECT 56) which contain user-user data exchanged between the two base station controllers 20, 30. User-user information is non-voice data allowed for in telecommunications standards and is carried in the set-up message slots provided for in the various standards. The call set-up messages also include user-user type messages that are exchanged between the BSC 20, 30 and the mobile switching center (MSC) 25 such as "Assign Request", "Assign Complete", and "Connect Ack" messages. Preferably, the set-up message format used is the type defined in GSM recommendation 0.4.08, version 3.8.0, March 1990. While the GSM telecommunications standard is preferred, other standards capable of carrying user-user information may be used.

The user-user data contains information pertaining to the fixed subscriber unit (FSU) port connected to the BSC. The data contain codec version, Digital Speech Interpolation (DSI) status, and call mode information. This exchange of user-user data informs the origination port that the destination port is also a fixed wireless cellular communication port, that the lines between the FSUs are capable of transmitting digital data, and that there is compatible hardware and software to process the call at the destination port. The user-user information is generated by, and interpreted in, the CCP 23 assigned to the call in each BSC 20, 30.

As seen in FIG. 3, the source BSC 20 first begins a call by sending a SETUP message 52 containing user-user information which is received by the destination BSC 30. The SETUP message 52 queries the destination BSC 30 about the source BSC 20. The mobile switching center (MSC) 25 then informs the call control processor (CCP) 23 assigned to the call at both the source BSC 20 and the destination BSC 30 that a call is in progress. The MSC 25 then sends a Channel Assign request to the CCP 23 at both the source and destination BSCs 20, 30. The CCP 23 on either end of the call then communicates with the channel allocation processor (CAP) 22 to assign a channel to the call. The CAP 22 then assigns the required number and type of switching transcoder modules (STM) 21 and communicates with the MSC 25 to inform the MSC 25 that the call assignments are completed.

The channel allocation process used in the base station controller 20, 30 is preferably digital speech interpolation (DSI). In DSI, when a TRF STM is deallocated and a CNG STM transmits idle bytes on an E1 line 24, this is detected as voice inactivity by the VAD STM and reported to the CAP 22 which then deallocates both the RF air channel on the cellular channel and the T1 line 17 used in the call. When the VAD STM does detect a speech spurt, this is also reported to the CAP 22, which then assigns an RF air channel and a T1 channel 17 to the appropriate FSU 10, 40 port, and the voice packet exchange resumes. Other channel allocation processes, aside from DSI, may be used in the present invention.

After setting up the channel assignments for the call at both ends, the CCP 23 of the destination BSC 30 sends an ALERT message 54 back to the CCP 23 of the source BSC 20. The ALERT message 54 carries user-user information, responsive to the SETUP 52 query, informing the source BSC 20 as to whether or not the hardware and software at the destination BSC 30 are compatible for setting up a packet channel carrying compressed information.

Following reception of the ALERT message 54 from the destination BSC 30, the MSC 25 sends a ring back tone to a TRF STM. This ring back tone arrives at the origination port and sounds to the caller like a ring tone. With each ring back tone from the MSC 25, the VAD STM detects the activity and inactivity of the sound signal. When a person at the destination port answers the call, a CONNECT message 56 is sent from the CCP 23 of the destination BSC 30 to the CCP 23 of the source BSC 20. If the user-user information sent earlier shows a compatible FSU 40, then the packet channel compression begins. Both the source BSC 20 and the destination BSC 30 assign a VAD STM and a CNG STM to handle the telephone call.

The initialization of the packet channel format starts after a "Connect ACK" message is sent to the destination BSC 30. First, the CNG STM generates an idle pattern on the E1 transmission channel 24. When this is detected by the VAD STM at the source BSC 30, the STM sends a "packet channel okay" message to the channel allocation processor 22 to inform that the packet channel synchronization is complete. As part of the packet channel initialization, any echo cancelers in the switch 25 are disabled so that the speech and user-user information is not disrupted or modified. Preferably, the echo cancelers are only on if the packet synchronization fails.

Once synchronization is complete, the CAP 22 reassigns all the necessary STMs 21 that are needed for the call in the packet channel mode. The comfort noise generation STM at the source BSC 20 then sends an idle pattern to the destination BSC 30 which performs the same initialization steps. The TRF STM at the origination BSC 20 receives a compressed voice information from the MSU 10, packetizes the compressed speech bytes and sends them to the destination BSC 30 where the traffic STM decodes the packetized information and sends only compressed speech bytes to the destination FSU. The destination FSU 40 decompresses the compressed speech bytes and converts them into a normal analog voice signal.

A preferred packet message format in the present method is a 320-byte frame. Each frame contains five fields: SYNC Word, Message Type, Sequence Number, Data, and Checksum. A TRF STM assigned to the particular telephone call performs the formatting. The Data field contains the compressed speech and is preferably 28 bytes long. When there are periods of no voice activity detected, the Data field contains an idle pattern generated by the assigned comfort-noise-generation STM. Multiple 28-byte Data field messages are contained in a 320-byte frame. Each frame also includes redundant speech packets to insure against bit errors. Padding bytes are inserted to fill up leftover space if all 320 bytes are not filled in each 40 millisecond frame.

If the user-user information indicates that a compatible FSU does not exist at the destination port 40, the source BSC 20 does not packetize the compressed digital signal. Instead, the source BSC 20 uses the TRF STM to decompress the voice information for transmission over PSTN lines.

In a preferred embodiment, the telephone handsets 5, 45 are analog telephones and the origination and destination ports 10, 40 are multi-subscriber units (MSU) capable of supporting 96 telephones. The MSU may have an antenna attached to a building for transmission to a nearby base transceiver system. Also in a preferred embodiment, the MSU converts the analog signal received from the telephones into digital pulse code modulated (PCM) compressed voice signals and then further compresses the PCM signals to five kilobit-per-second (kbps) signals. However, any of a number of known compression methods may be used in the present invention as long as the origination and destination port have compatible compression-decompression abilities. In other preferred embodiments, the fixed subscriber unit may be a single subscriber unit of the type to which a residential phone would connect. Alternatively, the origination or destination port may be a portable subscriber unit and usable in mobile telephone environments.

In a presently preferred embodiment of the speech compression process, a variation of traditional Codebook Excited Linear Prediction (CELP) technology is used. This embodiment of a preferred compression/decompression process is disclosed in copending U.S. application Ser. No. 07/905,992 filed Jun. 25, 1992, the entire disclosure of which is incorporated herein by reference. The compression and decompression process is performed by both the source and destination MSU 10, 40. The compression and decompression steps are executed at least once every 40 milliseconds. By implementing a preferred embodiment of the present method, a second compression and decompression step is avoided in MSU to MSU calls. These extra steps would delay a voice signal by approximately 90 milliseconds and degrade the voice signal due to the extra processing required.

In another preferred embodiment, the present method may operate in a wireless cellular system that does not require user-user information channels to initiate a packet channel format. The method may use in-band signalling to inform the source and destination BSC's of compatibility for the single compression/decompression transmission using packetized information. In this embodiment, the packet channel is initiated autonomously and without any user-user signalling on a common control channel interface. Rather than attempt to first determine compatibility of the FSUs on either end of a call, the presently preferred method immediately attempts to initiate the single compression/decompression packet channel mode by sending an initialization pattern from the destination BSC to the source BSC. The Destination BSC then waits for a period of time and looks for a synchronization response and packetized voice information.

Figure 4:
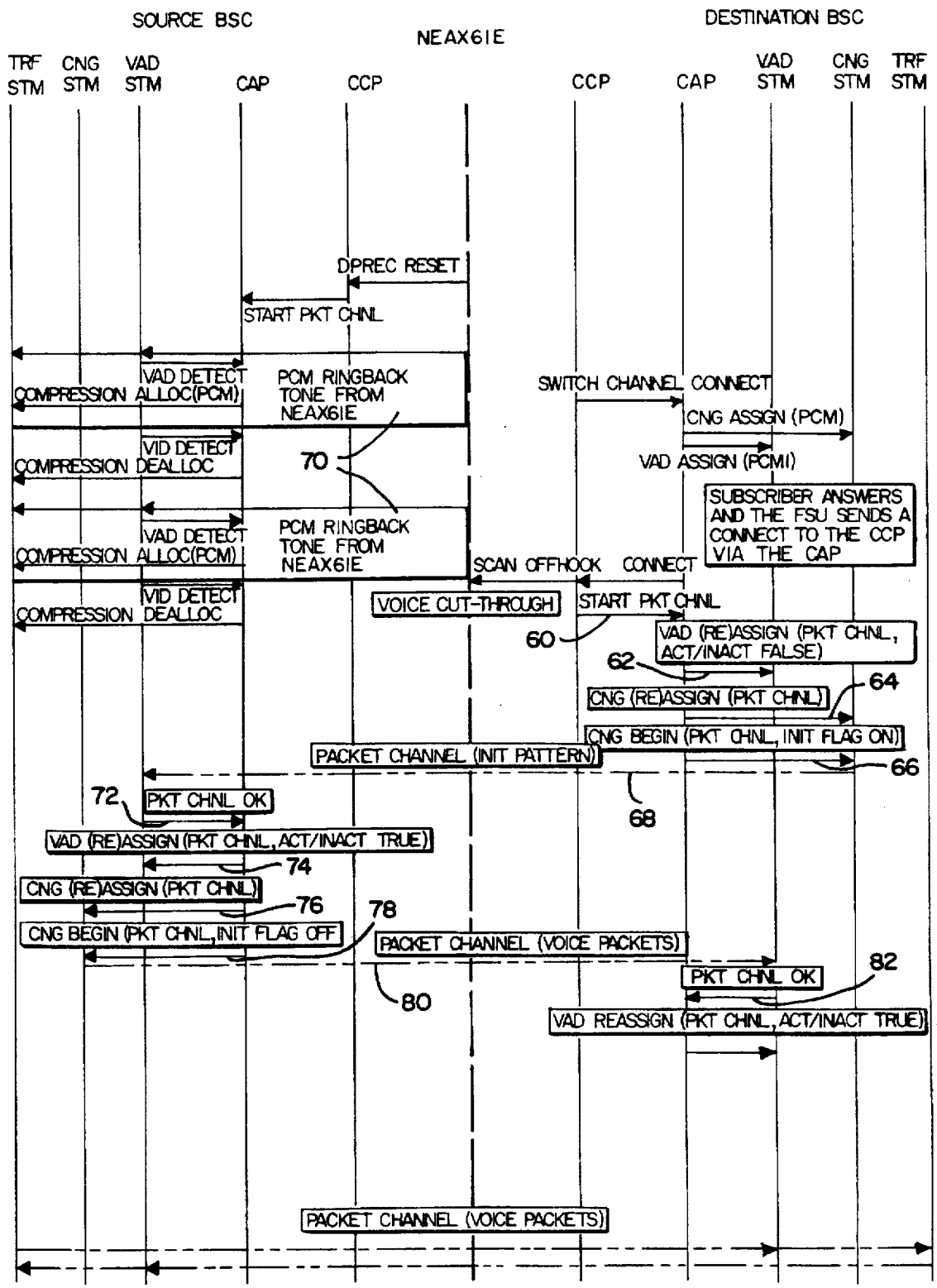
FIG. 4 is a call flow chart of a voice signal transported according to a second embodiment of the present invention.

Referring again to FIG. 1, the switch 25 is preferably a non-MSC device such as a NEAX61E end-office manufactured by NEC, Inc. It should be understood that other switches, including MSCs, may be used. The in-band signalling allows for the packet channel to be compatible with any switch provided the call is from an FSU to an FSU and a reliable transmission media, capable of carrying uncorrupted digital information, exists between the BSC's 20, 30. By FIG. 4 best shows a preferred in-band signalling process used to initiate the single compression/decompression packet channel feature. The origination port 10 communicates to the source BSC 20, in the same manner as described above for user-user applications, that a call is being initiated. Port specific data from the FSU 10, such as codec version and DSI status, are passed to the BSC 20 at the beginning of the call. The BSC 20 then informs the switch 25 that a call is coming through and the switch, via the destination BSC 30, pages the destination FSU 40.

The source BSC 20 always begins the call in PCM mode. The switch 25 sends the CCP 23 in the source BSC 20 a digital pulse receive (DPREC) reset command to indicate that enough digits have been received to complete the call. The CCP 23 also sends a Start Packet Channel command to the CAP 22 even though the source BSC remains in PCM mode during the ringback phase.

At the destination BSC 30 an Alert message is sent to the destination FSU 40 and a Connect reply is returned to the BSC 30 if the FSU is answered. Upon receipt of the Connect reply, the CCP in the destination BSC will send a Start Packet Channel message 60 to the CAP 22. The VAD STM receives a VAD Assign message 62 from the CAP containing a Packet Channel Flag and an Active/Inactive Flag. The Packet Channel Flag is set to TRUE and the Active/Inactive Flag is set to False. The VAD Assign message 62 also contains FSU port specific data and Pkt-Errored Frames values. The FSU port specific data preferably includes Codec version and DSI status. The Pkt-Errored Frames variable is a predetermined number that represents the number of message time frames containing errors that the system will tolerate before declaring a packet channel mode failure.

The VAD Assign command 62, in conjunction with the Packet Channel Flag set TRUE and the Active/Inactive Flag set False, informs the VAD STM that the packet channel initialization is beginning. Once the VAD STM recognizes that the Packet Channel Initialization is starting, it starts a timer. The timer counts up to the Frame Sync Num value. During the time before the Frame Sync Num value is reached, the destination BSC 30 remains in Packet Channel Mode and looks at incoming data from the source BSC 20 for packet channel voice packets to achieve synchronization with the source BSC. Although the Frame Sync Num variable is preferably two time frames, higher values may be necessary to allow synchronization of packet channel mode for different wireless cellular systems.

The CNG STM in the destination BSC receives a CNG Assign command 64 with Packet Channel Flag set ON. Next the CNG STM receives a CNG Begin or Decompression Assign command depending on the presence of voice activity. If there is no voice activity from the FSU to the BSC, commonly referred to as reverse voice activity, the CAP sends a CNG Begin command 66 with Packet Channel Flag and Packet Channel Init Flag ON. This command informs the CNG STM that it should generate a Packet Channel Initialization Pattern 68 to send over the E1 line 24 on the appropriate time slot. If reverse voice activity exists, the CAP sends a Decompression Assign command with the Packet Channel Flag Set ON and the Tx Enabled Flag set ON. FSU port specific data and redundant packets of voice information are also sent in the standard 320 byte frame in the Decompression Assign command. These steps only occur in startup to insure that packet channel initialization starts regardless of the presence of reverse voice activity.

The Packet Channel Initialization Pattern preferably includes 48 bytes of idle bytes and 16 bytes of initialization data that includes port specific data such as codec version and DSI status. These 64 bytes are repeated five times to fill up the 320 byte frame sent over the E1 timeslot to the source BSC.

Up until the CNG STM transmits the Packet Channel Initialization Pattern, the source BSC 20 is in PCM mode receiving ringback tones 70 from the switch. The source BSC also monitors the data coming in from the destination BSC on the E1 line 24. If, as in FIG. 4, the destination BSC transmits the initialization pattern 68 for packet channel mode, the VAD STM of the source BSC analyzes the signal for the SYNC WORD message and the FSU port specific data. The VAD STM compares the FSU data received with local FSU data received from the CAP in the earlier VAD Assign message. If the data are the same, the VAD STM transmits a Packet Channel OK 72 signal to the CAP.

The CAP will re-assign 74 the VAD STM with the Packet Channel Flag set to ON and Active/Inactive Flag set to TRUE. This VAD Reassign command 74 differs from the earlier VAD reassign command 62 in the destination BSC in that the VAD reassign command 74 now sets the Active/Inactive Flag to TRUE. This Flag setting indicates to the VAD STM that Packet Channel mode has started and that no timer needs to be started. The VAD STM will now monitor the incoming E1 data for voice activity detected/voice inactivity detected (VAD/VID) in Packet Channel mode. At this point the source BSC has verified that the destination is a FSU port and the port data is compatible. So we can start data transmission in Packet Channel format. The CNG STM is Reassigned 76 with Packet Channel Flag set to ON. Any subsequent CNG Begin 18 will have the Packet Channel Flag set to ON and Packet Channel Init Flag set to OFF. This indicates that the CNG STM can send Packet Channel Idle Pattern instead of the Initialization Sequence. The TRF STM is (re)assigned with the Packet Channel Flag set to ON and Tx Enabled Flag set to ON, as well as the Redundant Packets and other FSU data. The Tx Enabled Flag indicates that the Voice Packets can be transmitted on the E1 timeslot instead of the Packet Channel Initialization Pattern 68 as was the case in the destination BSC. The TRF STM is also assigned with the Packet Channel Flag and Packet-Errored Frames. The destination BSC now receives Packet Channel Data on the incoming E1 timeslots and the VAD STM receives the Packet Channel Voice Packets 80.

While the source BSC has been verifying the compatibility of the FSU's, the VAD STM in the destination BSC has been running the timer mentioned above. If the VAD STM receives the Packet Channel data before the timer, based on the Frame Sync Num variable mentioned above, expires the VAD STM will send a Packet Channel OK 82 to the CAP. The VAD STM at the destination BSC will not need to compare the FSU port specific data since it has already been done at the origination BSC. All subsequent CNG Begin messages will have the Packet Channel Flag set to ON but the Packet Channel Init Flag will be set to OFF to allow the CNG STM to transmit a Packet Channel Idle Pattern.

Figure 5:
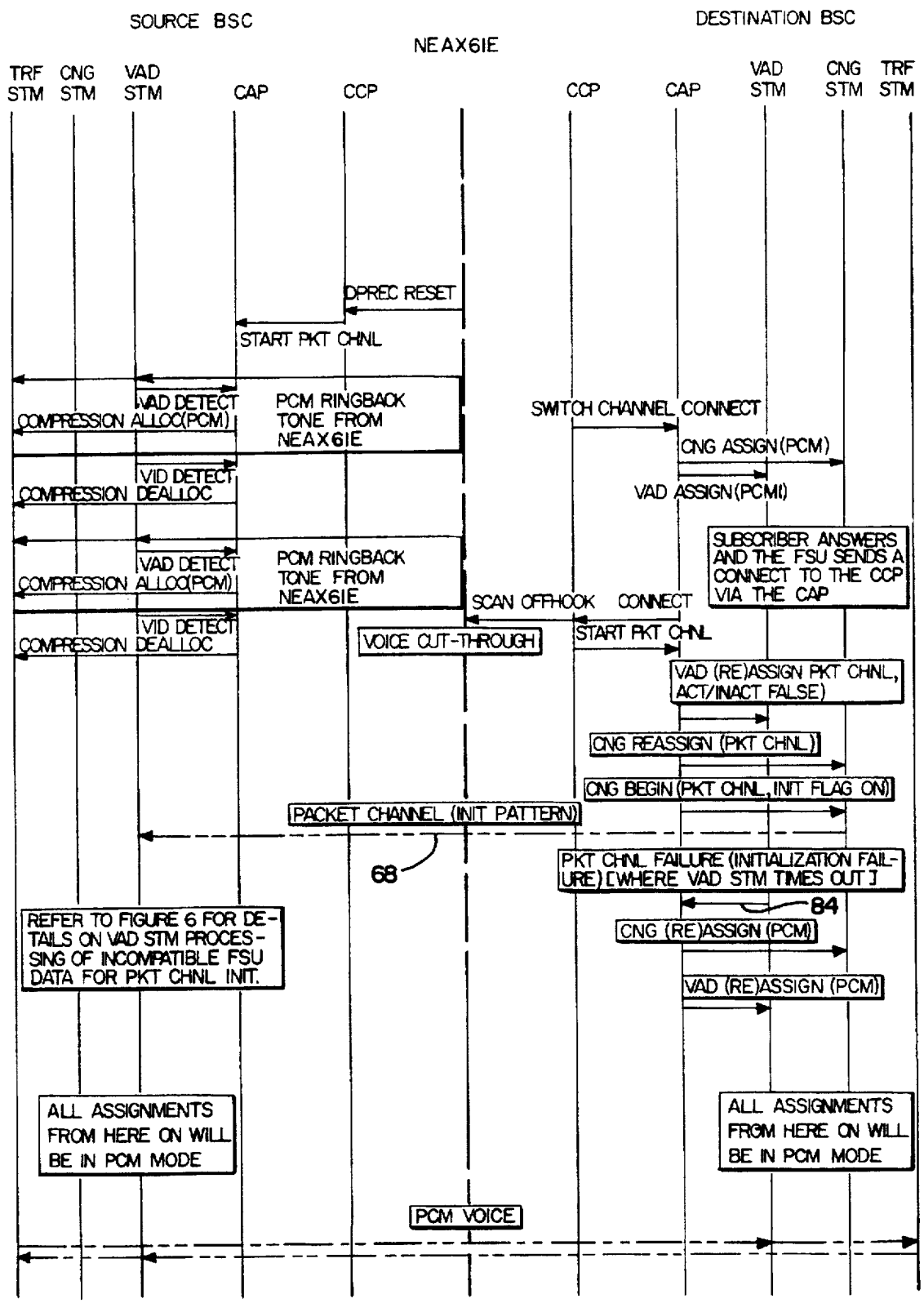
FIG. 5 is a call flow chart of an unsuccessful FSU-to-FSU call using the method illustrated in FIG. 4.

FIG. 5 depicts the flow of an unsuccessful call setup between two FSU ports. The failure is due to incompatible FSU port data. As with the successful setup, the source BSC sets up the call in PCM mode and allows Ringback to come in from the Switch as normal PCM data which is then compressed at the STM and decompressed at the FSU. Similarly, at the destination BSC the Connect message comes and the STMs are assigned in Packet Channel mode. As before, the VAD STM in the destination BSC starts a timer (based on Frame Sync Num) and starts looking at the incoming data for Packet Channel voice packets to achieve synchronization. The CNG STM receives a CNG Assign with Packet Channel Flag set to ON. The CNG Assign also contains the FSU port specific data, such as the FSU Codec Version and DSI mode. The CNG STM, upon receiving a CNG Begin command from the CAP, sends a Packet Channel Initialization Pattern 68. The VAD STM recognizes that initialization is starting and begins the timer that will run for up to Frame Sync Num frames.

At the source BSC, all assignments have been in PCM mode to allow Ringback from the NEAX61E to go through. The VAD STM although functioning in PCM mode is also monitoring the incoming E1 data from the destination BSC to look for Packet Channel Initialization Pattern. When the voice-through occurs, the incoming E1 data is Packet Channel Initialization Pattern. The VAD STM detects the Packet Channel by looking for 48 Packet Channel Idle bytes in a row and then looking for the SYNC WORD. Once this has been detected the FSU port specific data is compared with the local FSU data received from the CAP as part of the VAD Assign command. If, as is the case in FIG. 5, they are found to be incompatible the VAD STM does not generate any Packet Channel OK/Failure message to the CAP. The CAP in the source BSC continues to function as if the call will remain in PCM mode and all STM assignments will continue to be in PCM mode.

The destination BSC, while monitoring for Packet Channel Voice data, receives PCM data on the incoming E1 timeslots. Because the VAD STM receives PCM voice data and does not receive Packet Channel data, it will timeout at the end of Frame Sync Num frames. The VAD STM in the destination BSC then sends a Packet Channel Failure message 84, indicating initialization failure, to the CAP. Upon receipt, the CAP will then reassign all previously assigned STMs in PCM mode. Any new assignment will be in PCM mode and the call will continue in PCM mode.

Figure 6:
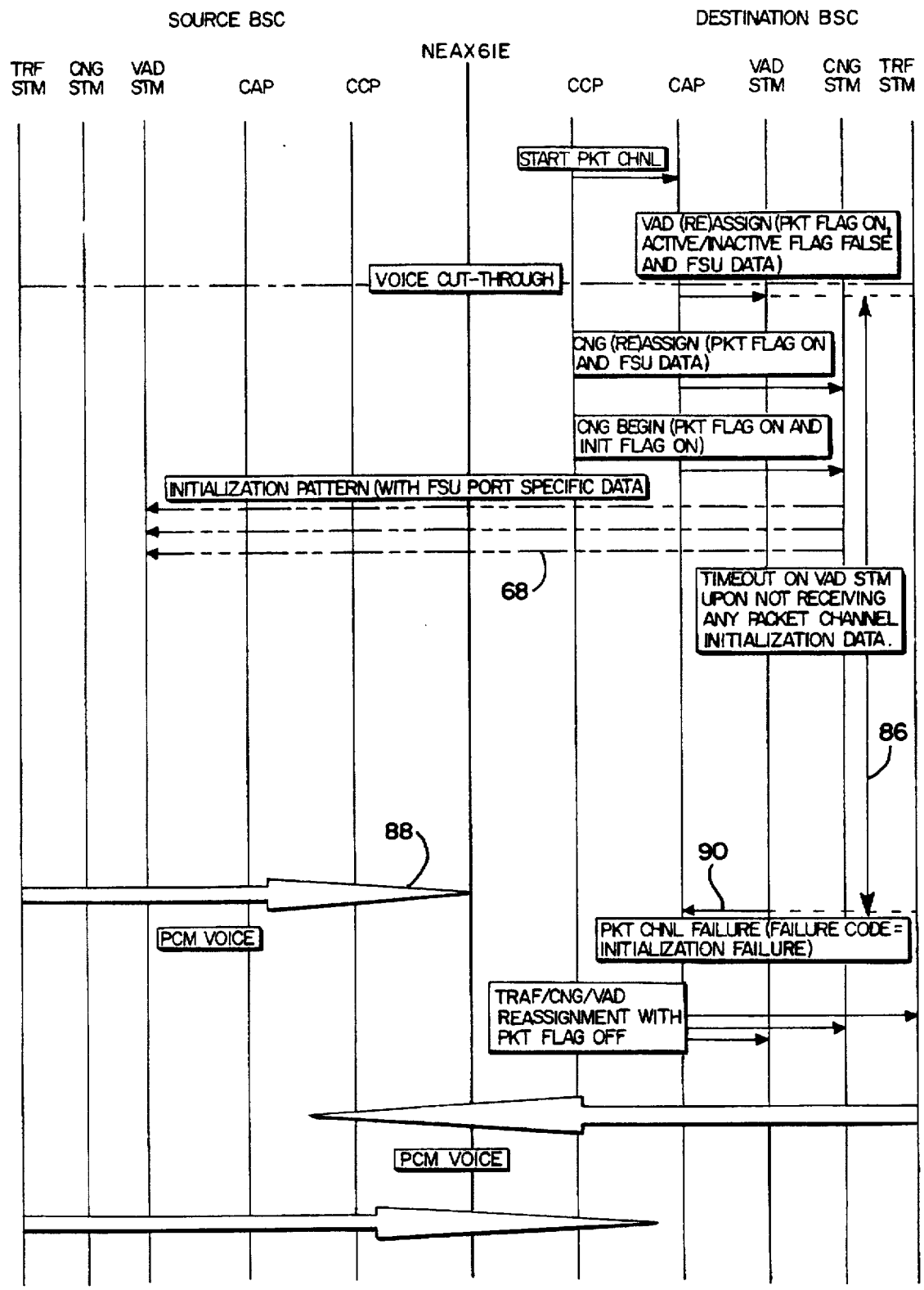
FIG. 6 is a call flow chart detailing the failure response of a VAD STM in a destination BSC for the unsuccessful call of FIG. 5.

FIG. 6 best shows the call flow and steps performed by the VAD STM in the destination BSC when the desired single compression/decompression and packet channel mode cannot be established. The VAD STM makes several attempts to send the Packet Channel Initialization Pattern 68 to the source BSC. At the end of the Frame Sync Num time period 86 the source BSC has only sent decompressed PCM voice data 88 and so the VAD STM sends a packet channel failure (Pkt Chnl Failure) 90 message to the CAP. Subsequently, the CAP reassigns the STMs to operate in PCM mode. All of the following communication for the call will be in PCM mode and require the two compression and two decompression steps.

Figure 7:
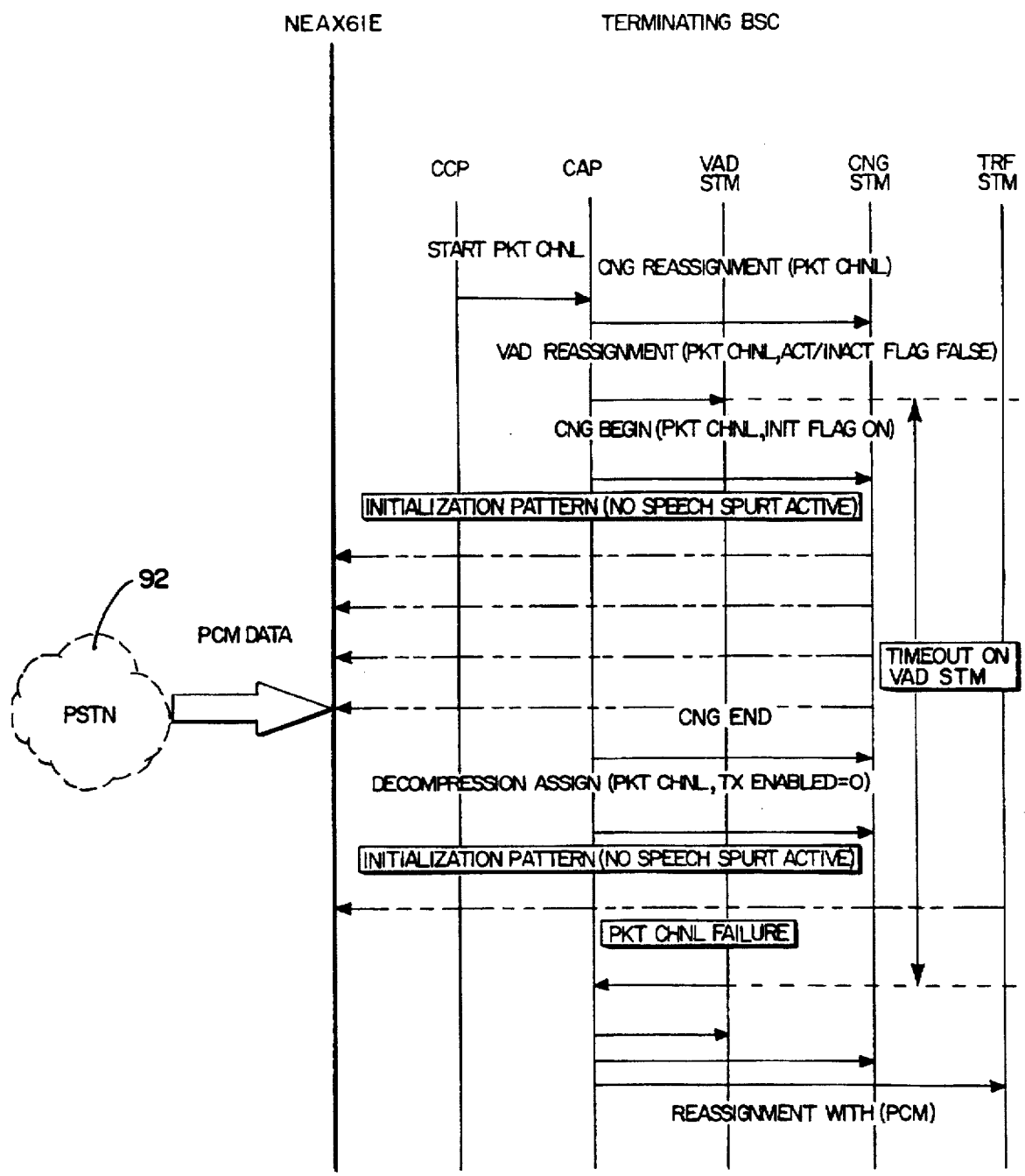
FIG. 7 is a call flow chart of a call originating from the PSTN.

As shown in FIG. 7, another situation in which the method will revert to a PCM mode call is when a port on the PSTN 92 calls an FSU. This situation will always lead to an unsuccessful call setup in Packet Channel mode and is similar to the failure of call setup between FSU to FSU call due to incompatible FSU port data. On the origination side, the PSTN port is transmitting PCM data towards the destination BSC. The VAD STM at the destination BSC reacts in the same manner as in the previous case where the VAD STM will time out and send a Packet Channel Failure signal to the CAP. The CAP at this point will reassign all previously assigned STMs in PCM mode. Any new assignment will be in PCM mode and the call will continue in PCM mode.

Similar to the PSTN to FSU call situation, an FSU to PSTN call will always be unsuccessful. In this case the call remains in PCM mode through the entire duration. The initial assignments are made in PCM mode at the origination BSC. The VAD STM will constantly monitor the incoming E1 data to detect a Packet Channel Initialization Pattern. If it does not detect such a pattern it continues to function in the PCM mode.

From the foregoing, it should be apparent that a method for transporting compressed information in a fixed cellular phone system has been described which utilizes a single compression-decompression step. The method improves speech quality at both the origination and destination ports and also eliminates the extra delay added when a second compression-decompression step is included. The method makes use of existing hardware and cellular telephone technology. In addition, the method may implement existing call set-up information datalines used in present communication systems or may communicate set-up information in-band.

It is intended that the foregoing detailed description be regarded as illustrative rather than limiting, and that it be understood that it is the following claims, including all equivalents, which are intended to define the scope of this invention.

What is claimed is:

1. In a wireless radio communications system having a plurality of origination ports and destination ports in which an origination port having a speech compression format for communication with an origination base station and a destination port having a speech compression format for communication with a destination base station, communicate with each other through the base stations, the base stations communicating with each other through a switching center, and wherein each of the origination port speech compression formats may not be compatible with each of the destination port speech compression formats, a method of transporting speech information between the origination base station and the destination base station comprising the steps of:

receiving a data stream from the origination port containing digitized, compressed speech in the origination port speech compression format;

determining compatibility of the destination port speech compression format with the origination port speech compression format by sending information between the origination base station and the destination base station in user-user data messages;

if the destination port speech compression format is determined to be compatible with the origination port speech compression format, creating packets of compressed digital signals in accordance with the origination port speech compression format;

transmitting the packets of compressed digital signals from the origination port to the destination port through the origination base station, switching center and destination base station.

2. The method of claim 1 wherein the step of sending information between the origination base station and the destination base station comprises the step of:

sending information from a channel allocation processor and a call control processor of the origination base station to a channel allocation processor and a call control processor of the destination base station.

3. The method of claim 1 wherein the step of determining compatibility of a destination port with an origination port comprises the steps of:
- paging a destination port from the origination base station via the switching center and the destination base station;
- sending an in-band initialization pattern from the destination base station to the origination base station to determine compatibility of the destination port with the origination port; and
- comparing the in-band initialization pattern sent to the origination base station with the in-band initialization pattern of the origination port.

4. The method of claim 1 wherein the step of determining compatibility of a destination port with an origination port comprises the steps of:
- paging a destination port from the origination base station via the switching center and the destination base station;
- monitoring messages received at the origination base station from the switching center for an in-band initialization pattern from the destination base station; and
- upon receipt of an in-band initialization pattern from the destination base station, comparing the in-band initialization pattern sent to the origination base station with the in-band initialization pattern of the origination port to determine compatibility of the destination port with the origination port;
- wherein if no in-band initialization pattern from the destination base station is received, creating packets of compressed digital signals in accordance with a standardized format other than the origination port speech compression format; and
- wherein the step of transmitting the packets of compressed digital signals comprises transmitting the packets of compressed digital signals from the origination port to the destination port through the origination base station, switching center and destination base station using the standard format.

5. The method of claim 1 wherein the origination base station includes a plurality of switching transcoder modules linked to a channel allocation processor and wherein the step of transmitting the packets of compressed digital signals further comprises the steps of:
- determining the stop and start of speech using a voice activity detector switching transcoder module;
- creating a packet channel idle signal using a comfort noise generation switching transcoder module; and
- packetizing data using a traffic switching transcoder module.

6. The method of claim 1 wherein the origination port is a portable telephone subscriber unit.

7. The method of claim 1 wherein the origination port is a fixed subscriber unit.

8. The method of claim 1 wherein the step of providing a voice signal to the origination port comprises receiving an analog voice signal at the origination port from a telephone.

9. The method of claim 1 wherein the step of transmitting the packets of compressed digital signals further comprises the steps of:
- transmitting the compressed digital signals via radio telephone frequencies to a transceiver at the origination base station;
- transporting the compressed digital signals from the origination base station to an origination base station controller along time division multiplexed trunk lines;
- transmitting the compressed digital signals between the origination base station controller and a destination base station controller via a switch using time division multiplexed trunk lines; and
- transporting the compressed digital signals from the destination base station controller to the destination base station along time division multiplexed trunk lines.

10. The method of claim 1 wherein the step of transmitting packets of compressed digital signals further comprises transporting the compressed digital signals from the origination base station to an origination base station controller along T1 lines.

11. The method of claim 1 wherein the step of transmitting packets of compressed digital signals further comprises transmitting the compressed digital signals between the origination base station controller and a destination base station controller via a switch using E1 transmission lines.

12. The method of claim 1 wherein the packets of compressed digital signals are formatted into 320 byte frames.

13. The method of claim 9 wherein the origination base station controller comprises:
- at least one channel allocation processor;
- at least one call control processor linked to the channel allocation processor; and
- a plurality of switching transcoder modules linked to the channel allocation processor.

14. The method of claim 13 wherein the plurality of switching transcoder modules further comprise:
- at least one traffic switching transcoder module creating packet data from a compressed PCM signal and decoding packet data into compressed PCM signals;
- at least one voice activity detector switching transcoder module determining the stop and start of speech; and
- at least one comfort noise generation switching transcoder module transmitting a package channel idle signal.

15. A method of transporting speech information in a wireless radio telephony system between a plurality of source radio telephony subscriber units and destination subscriber units which may not be compatible with each other comprising the steps of:
- paging a destination subscriber unit from a source base station via a switching center and a destination base station in response to call initiation from a source radio telephony subscriber unit;
- sending an in-band initialization pattern from the destination base station to the source base station to determine compatibility of the destination subscriber unit with the source radio telephony subscriber unit;
- comparing the in-band initialization pattern sent to the source base station with local data; and
- sending speech information in a compatible format from the source base station to the destination base station if the initialization pattern and local data are compatible.

16. The method of claim 15 further comprising the step of:
- creating packets of compressed digital signals in accordance with a standardized format other than the compatible format, if no in-band initialization pattern from the destination base station is received; and
- wherein the step of sending speech information comprises transmitting the packets of compressed digital signals from the source radio telephony subscriber unit to the destination subscriber unit through the source base station, switching center and destination base station using the standard format.

17. The method of claim 15 wherein the step of sending speech information further comprises the steps of:

transmitting compressed digital signals via radio telephone frequencies to a transceiver at the source base station;

transporting the compressed digital signals from the source base station to a source base station controller along time division multiplexed trunk lines;

transmitting the compressed digital signals between the source base station controller and a destination base station controller via a switch using time division multiplexed trunk lines; and transporting the compressed digital signals from the destination base station controller to the destination base station along time division multiplexed trunk lines.

18. The method of claim 15 wherein the source base station includes a plurality of switching transcoder modules linked to a channel allocation processor and wherein the step of sending the speech information further comprises the steps of:

determining the stop and start of speech using a voice activity detector switching transcoder module;

creating a packet channel idle signal using a comfort noise generation switching transcoder module; and packetizing data using a traffic switching transcoder module.

19. The method of claim 15 wherein the source subscriber unit is a portable radio telephone subscriber unit.

* * * * *